United States Patent
Troy et al.

(10) Patent No.: US 12,391,529 B2
(45) Date of Patent: Aug. 19, 2025

(54) MOTION LOCKOUT FOR PLATFORM MOVER SYSTEM

(71) Applicant: The Boeing Company, Chicago, IL (US)

(72) Inventors: James J. Troy, Issaquah, WA (US); Katherine L. Varela, Seattle, WA (US); Charles M. Richards, Kent, WA (US); Nicholas Gholdoian, Kirkland, WA (US)

(73) Assignee: THE BOEING COMPANY, Arlington, VA (US)

( * ) Notice: Subject to any disclaimer, the term of this patent is extended or adjusted under 35 U.S.C. 154(b) by 788 days.

(21) Appl. No.: 17/537,658

(22) Filed: Nov. 30, 2021

(65) Prior Publication Data

US 2022/0324688 A1 Oct. 13, 2022

Related U.S. Application Data

(60) Provisional application No. 63/172,865, filed on Apr. 9, 2021.

(51) Int. Cl.
*B66F 17/00* (2006.01)
*B66F 9/075* (2006.01)
*B66F 11/04* (2006.01)

(52) U.S. Cl.
CPC ........ *B66F 17/006* (2013.01); *B66F 9/07568* (2013.01); *B66F 11/04* (2013.01)

(58) Field of Classification Search
CPC ..... B66F 17/006; B66F 9/07568; B66F 11/04
(Continued)

(56) References Cited

U.S. PATENT DOCUMENTS 7,194,358 B2 * 3/2007 Callaghan ............. B66F 17/006
  340/436
10,005,652 B1 * 6/2018 Cui ........................ E04G 1/24
(Continued)

FOREIGN PATENT DOCUMENTS

| CN | 102701122 B | 3/2015 |
|----|-------------|--------|
| EP | 1537036 A1  | 6/2005 |

(Continued)

OTHER PUBLICATIONS

EP Search Report mailed Aug. 3, 2022 in re EP Application No. 22167107.6.
(Continued)

*Primary Examiner* — Logan M Kraft
*Assistant Examiner* — Anthony Donald Taylor, Jr.
(74) *Attorney, Agent, or Firm* — COATS & BENNETT, PLLC

(57) ABSTRACT

The system includes a drive vehicle configured to attach to the platform at a pivot point and to move the platform relative to the target object. One or more distance sensors are positioned to sense the target object, and one or more rotation angle sensors acquire an angular position of the drive vehicle relative to the platform. A processing circuit is configured to calculate one or more distances between the platform and the target object based on inputs from the one or more distance sensors. The processing circuit receives a command to move the drive vehicle in one or more forward, reverse, or rotational directions. The processing circuit allows motion in one or more directions in which the platform will not contact the target object and prevents motion in one or more directions that would cause the platform to contact the target object.

20 Claims, 16 Drawing Sheets

(58) Field of Classification Search
USPC .......................................................... 701/116
See application file for complete search history.

(56) References Cited

U.S. PATENT DOCUMENTS

| | | | | |
|---|---|---|---|---|
| 10,167,181 | B2* | 1/2019 | Xu | B66F 9/07568 |
| 10,625,427 | B2 | 4/2020 | Troy et al. | |
| 11,066,838 | B2 | 7/2021 | Richards et al. | |
| 2002/0179559 | A1* | 12/2002 | Hashiguchi | B66F 11/044 |
| | | | | 212/281 |
| 2005/0224439 | A1* | 10/2005 | Bean | B66F 11/046 |
| | | | | 212/280 |
| 2011/0014026 | A1* | 1/2011 | Benzing | E04G 25/06 |
| | | | | 187/244 |
| 2012/0211301 | A1* | 8/2012 | Clark | B66F 17/006 |
| | | | | 182/2.2 |
| 2018/0361595 | A1* | 12/2018 | Troy | B25J 9/162 |
| 2019/0185304 | A1* | 6/2019 | Lesquir | G06T 7/75 |
| 2019/0210855 | A1* | 7/2019 | Hao | B66F 11/044 |
| 2019/0256226 | A1* | 8/2019 | Shapoury | G06T 7/73 |
| 2019/0311555 | A1* | 10/2019 | Troy | B25J 9/1697 |
| 2020/0018079 | A1* | 1/2020 | Richards | G05D 1/0225 |
| 2020/0055356 | A1* | 2/2020 | Niewiadomski | B60R 1/003 |

FOREIGN PATENT DOCUMENTS

| | | |
|---|---|---|
| JP | 2002087797 A | 3/2002 |
| JP | 2013052948 A | 3/2013 |
| KR | 20160000931 U | 3/2016 |

OTHER PUBLICATIONS

Wikipedia, "Holonomic (robotics)", online article, retrieved on Jun. 25, 2018, pp. 1-2, retrieved from: https://en.wikipedia.org/wiki/Holonomic_%28robotics%29.

* cited by examiner

MOTION LOCKOUT FOR PLATFORM MOVER SYSTEM

RELATED APPLICATIONS

This application claims priority from U.S. Provisional App. No. 63/172,865, filed 9 Apr. 2021, the disclosure of which is incorporated by reference herein in its entirety.

TECHNOLOGICAL FIELD

The present application is directed to a system for moving a platform relative to a target object and, more particularly, to a system that prevents movement of the platform in one or more directions.

BACKGROUND

Many industrial settings use work platforms or other movable structures to position operators and/or equipment relative to a target object, such as a work piece. The platform is often large to support multiple operators and/or equipment and is positioned in close proximity to large target objects. One example is a platform for use with a large commercial aircraft. The platform can have a height in excess of twenty feet to perform various operations on the aircraft.

Some current methods of moving and positioning a platform include workers manually pushing and pulling the platform. Because of the large size and weight of the platform, this movement is often difficult and requires multiple workers. Workers can potentially become injured due to the large forces necessary to move and position the platforms. Another current method includes using equipment, such as forklifts, to move work platforms around a work floor. However, this type of equipment does not include automated collision avoidance capability to protect the target object from potential damage due to accidental contact.

It is often difficult to accurately position the platform relative to the target object. If the platform is not properly positioned relative to the target object such as being too far away or spaced away from the desired position, it may be difficult for the workers and/or equipment to work on the target object. Another issue with moving the platform is the potential for damaging the target object. The platform can accidentally run into the target object during the movement. This is particularly likely when the platform is required to be in very close position relative to the target object which is often required during various manufacturing processes.

Systems have been designed to prevent contact between the platform and the target object. These systems prevent movement of the drive vehicle to prevent the platform from contacting against the platform. However, these systems immobilize motion of the drive vehicle which prevents an operator from moving the drive vehicle and platform in any direction, such as to safely back them away from the target object.

Thus, there is a need for systems and methods of providing for the drive vehicle to move the platform in one or more directions that do not result in the platform contacting against the target object.

Unless explicitly identified as such, no statement herein is admitted to be prior art merely by its inclusion in the Background section.

SUMMARY

One aspect is directed to a system to move a platform relative to a target object. The system comprises a drive vehicle configured to attach to the platform at a pivot point and to move the platform relative to the target object, one or more distance sensors to sense the target object, and one or more rotation angle sensors to measure a relative rotation angle between the drive vehicle and the platform. A processing circuit is configured to: calculate one or more distances between the platform and the target object based on inputs from the one or more distance sensors; based on dimensions of the platform, position of the pivot point on the platform, and inputs from the one or more distance sensors and the rotation angle sensors, calculate heading angle limits and one or more allowable zones in which the drive vehicle can safely move the platform relative to the target object in order to avoid contact between the platform and the target object. The processing circuit is further configured to allow the drive vehicle to move in a first direction with a first relative heading angle that is within one of the allowable zones, and prevent the drive vehicle from moving in a second direction with a second relative heading angle that is outside of one of the allowable zones.

In another aspect, the processing circuit is further configured to move the drive vehicle at or less than an upper limit speed when a leading edge of the platform is located beyond a threshold distance away from the target object and to move the drive vehicle at or less than a slower second upper limit speed when the leading edge is located within the threshold distance from the target object.

In another aspect, indicator lights illuminate in a first color when the drive vehicle is able to move at the first upper limit speed and illuminate in a different second color when the drive vehicle is prevented from moving at the first upper limit speed.

In another aspect, the processing circuit is configured to determine two allowable zones with a first one of the allowable zones providing for just forward movement of the drive vehicle and a second one of the allowable zones providing for just reverse movement of the drive vehicle.

In another aspect, the processing circuit is further configured to calculate a pair of prohibited zones with the drive vehicle prevented from moving in either the forward or reverse directions within the prohibited zones.

In another aspect, the drive vehicle is configured to operate in a rotate only state when the drive vehicle is prohibited from moving in either the forward or reverse directions.

In another aspect, the processing circuit is further configured to determine that the platform is farther than a predetermined distance away from the target object and allowing the drive vehicle to move in any direction.

In another aspect, the processing circuit is further configured to determine a direction in which the drive vehicle is facing with respect to the platform.

In another aspect, the drive vehicle comprises a body, drive members connected to the body and configured to contact against a work floor, one or more motors to drive the drive members, and a mount attached to the body to connect to the platform.

In another aspect, the processing circuit is positioned within the drive vehicle.

One aspect is directed to a system to move a platform relative to a target object. The system comprises a drive vehicle configured to pivotably attach to the platform and to move the platform relative to the target object. A processing circuit is configured to: calculate one or more distances between the platform and the target object; acquire an angular position of the drive vehicle relative to the platform; calculate allowable heading angle limits in which the drive vehicle can move the platform relative to the target object in directions that avoid contact between the platform and the target object; receive a command to move the drive vehicle; determine that the commanded drive vehicle movement in a first direction is within an allowable zone and move the drive vehicle in the first direction that avoids contact between the platform and the target object; and determine that the commanded drive vehicle movement in a second direction is not within the allowable zone between the allowable heading angle limits and prevent the drive vehicle from moving in the commanded direction.

In another aspect, distance sensors are configured to attach to the platform and sense the target object and with the processing circuit configured to calculate the one or more distances between the platform and the target object based on inputs from the distance sensors.

In another aspect, the allowable zone is a first allowable zone and the processing circuit is further configured to: calculate a second allowable zone that is non-overlapping with the first allowable zone; determine that the drive vehicle can move just in a reverse direction in the first allowable zone; and determine that the drive vehicle can move just in a forward direction in the second allowable zone.

In another aspect, the processing circuit is further configured to move the drive vehicle at or less than a first upper limit speed when the platform is spaced away from the target object beyond a predetermined distance and move the drive vehicle at or less than a slower second upper limit speed when the platform is within the predetermined distance from the target object.

In another aspect, the drive vehicle further comprises a body configured to attach to the platform and drive members to move the body along a work floor.

One aspect is directed to a method of moving a platform relative to a target object with the method comprising: receiving a command to move a drive vehicle connected to the platform in a first direction; calculating one or more distances between the platform and the target object; acquiring a relative angle between the drive vehicle and the platform; determining one or more allowable heading angle limits of the drive vehicle and one or more an allowable zones based on the heading angle limits; using the drive vehicle to move the platform in the first direction when the direction of motion of the drive vehicle is within one of the allowable zones; and maintaining the platform at a current position when the first direction of motion of the drive vehicle is outside of one of the allowable zones.

In another aspect, the method comprises operating the drive vehicle in just a reverse state when the drive vehicle is facing into a first one of the allowable zones and operating the drive vehicle in just a forward state when the drive vehicle is facing into a second one of the allowable zones.

In another aspect, the method comprises determining one or more prohibited zones and operating the drive vehicle in just a rotate only state when the drive vehicle is facing into the one or more prohibited zones.

In another aspect, the method comprises slowing a maximum speed of the drive vehicle when the platform moves within a predetermined distance from the target object.

In another aspect, the method comprises displaying a different color on an indicator light on an operator interface at each time that the drive vehicle transitions to a different operational state.

The features, functions and advantages that have been discussed can be achieved independently in various aspects or may be combined in yet other aspects further details of which can be seen with reference to the following description and drawings.

DETAILED DESCRIPTION

Figure 1:
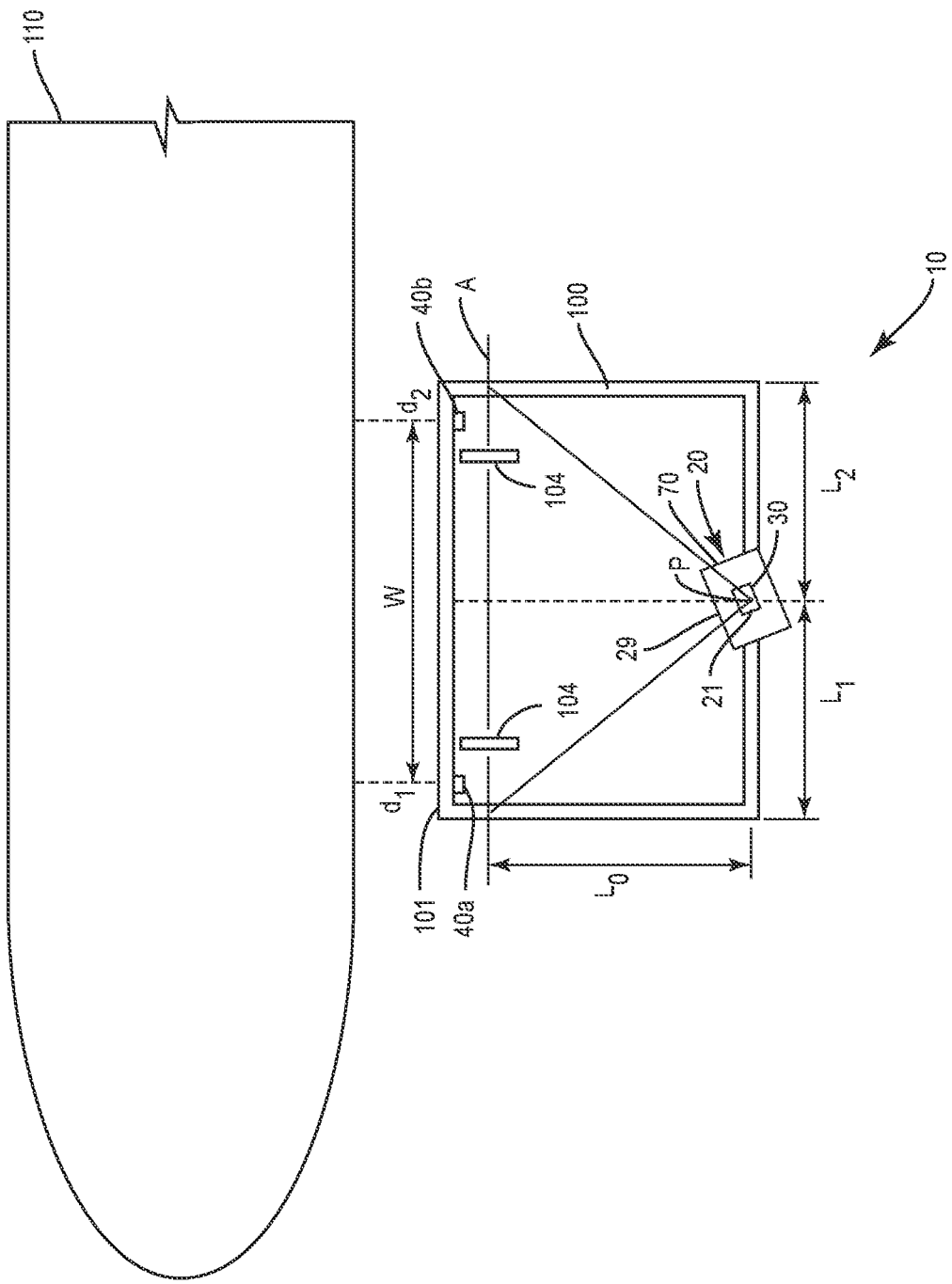
FIG. 1 is a top view two-dimensional (2D) drawing diagram of a drive vehicle connected to a platform and positioned in proximity to a target object.

FIG. 1 illustrates a top view of drive vehicle 20 configured to move a platform 100 relative to a stationary target object 110. The drive vehicle 20 is pivotably attached to the platform 100 at a point P. The platform 100 includes wheels 104 that are positioned along axis A. When the drive vehicle 20 applies a force to move the platform 100, the platform 100 rotates relative to the work floor 99 about a point anywhere along the axis A. Distance sensors 40a, 40b measure distances that the platform 100 is located away from the target object 110. Rotation angle sensor 30 acquires a relative angle between the drive vehicle 20 and the platform 100. The drive vehicle 20 receives a command to move in one or more forward, reverse, or rotational directions. Based on feedback from the one or more distance sensors 40a, 40b indicating the one or more distances that the platform 100 is spaced away from the target object 110 and from the rotation angle sensor 30 that acquires the angular position of the drive vehicle 20 relative to the platform 100, the drive vehicle 20 can move in one or more directions in which the platform 100 will not contact the target object 110 and is prevented from moving in one or more directions that would cause the platform 100 to contact the target object 110.

The platform 100 can include a variety of different structures and be used for a variety of different purposes. One example as illustrated in the side view shown in FIG. 2 includes the platform 100 with a frame 103 having an elevated work surface 102 configured to support one or more workers who may be performing operations on the target object 110. The frame 103 can also include steps to provide for egress to and from the elevated work surface 102. In another example, the platform 100 includes a work surface 102 in closer proximity to the work floor 99. In one example, the platform 100 includes specialty tooling that is moved between various work locations.

Figure 2:
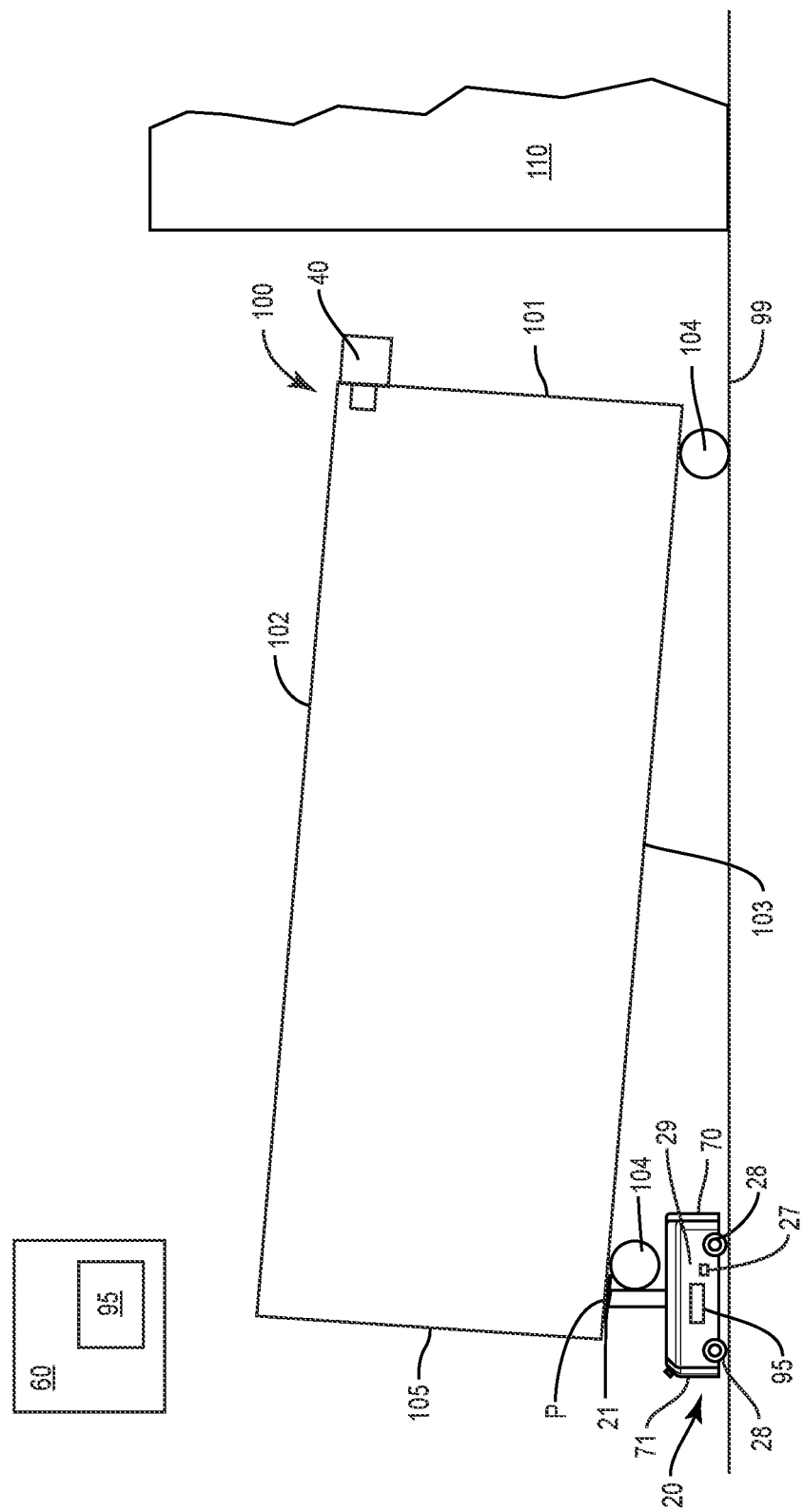
FIG. 2 is a side view 2D drawing diagram of a drive vehicle connected to a platform and with the drive vehicle elevating the platform.

The frame 103 also provides one or more positions for being engaged by the drive vehicle 20. In one example, the frame 103 includes a hitch that is engaged by a mount 21 on the drive vehicle 20. In another example, the frame 103 includes members, such as a support beam, that provide for attachment by the drive vehicle 20 at different locations. The platform 100 is configured to be moved by the drive vehicle 20 across a work floor 99 and be positioned relative to the target object 110. In one example as illustrated in FIG. 2, the platform 100 includes wheels 104.

The drive vehicle 20 is configured to attach to the platform 100 at point P. The drive vehicle 20 includes a body 29 that includes a front 70 and rear 71. The drive vehicle 20 includes drive members 28 to move along the work floor 99. The drive vehicle 20 can include various types of drive members 28, including but not limited to wheels and continuous tracks. The drive members 28 equipped with wheels can be configured with standard wheels, tracks, omni wheels, mecanum wheels, and/or swerve drive wheel modules for multi-axis movement. The drive vehicle 20 includes one or more motors 27 to provide power to one or more of the drive members 28. This power drives the drive vehicle 20 to move the platform 100 across the work floor 99. In one example, the drive vehicle 20 is a device configured solely for moving platforms 100 across the work floor 99. In another example, the drive vehicle 20 has other functionality, such as a forklift or tractor, which may be used to attach to and move the platform 100.

The drive vehicle 20 further includes a mount 21 configured to pivotably attach to the platform 100. The mount 21 can include various structures, including but not limited to one or more plates configured to receive the platform 100, a ball and/or hitch, and a gimbal connection between the mount 21 and the body 29. The pivoting connection forms the pivot point P that provides for the drive vehicle 20 to be positioned at different angular orientations relative to the platform 100. This provides for the drive vehicle 20 to adjust the angular position of the platform 100 relative to the target object 110. In one example, the drive vehicle 20 is configured to elevate a section of the platform 100 where it is connected at the mount 21. In one example as illustrated in FIG. 2, the drive vehicle 20 includes an extendable element with a telescoping and/or pivoting actuation to move between a retracted position and an extended position.

Figure 3:
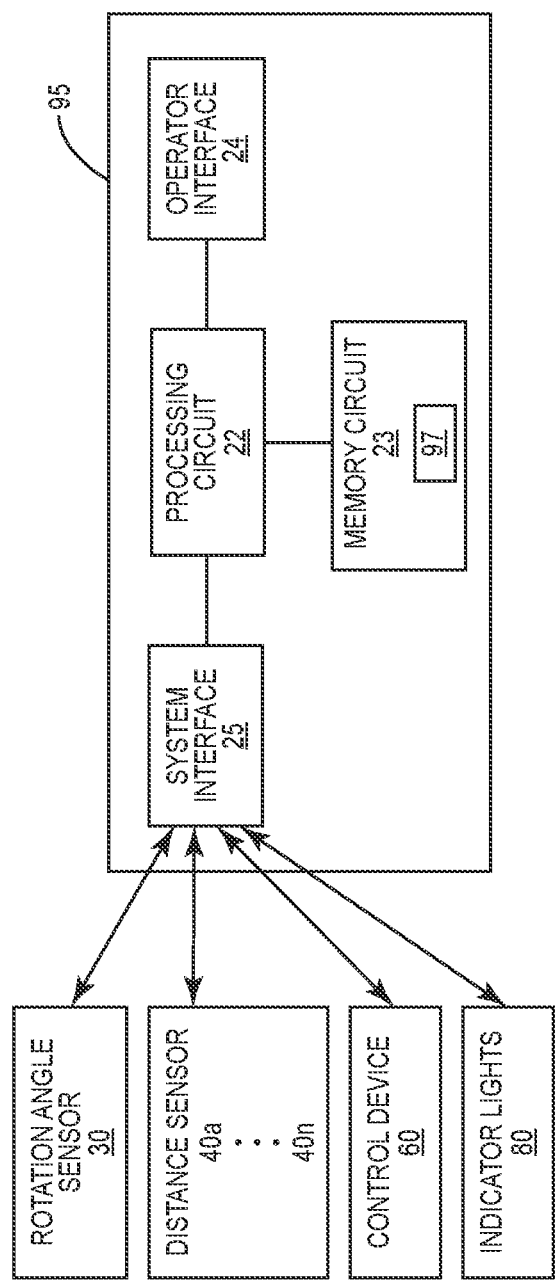
FIG. 3 is a block diagram of a control unit configured to send and/or receive signals from remote components.

A control unit 95 controls the movement of the drive vehicle 20. FIG. 3 is a block diagram that illustrates the control unit 95 that includes one or more processing circuits (shown as processing circuit 22) that includes one or more microprocessors, Application Specific Integrated Circuits (ASICs), or the like, configured with appropriate software and/or firmware. A computer readable storage medium (shown as memory circuit 23) stores data and computer readable program code that configures the processing circuit 22 to implement the techniques used to align the platform 100. Memory circuit 23 is a non-transitory computer readable medium and may include various memory devices such as random access memory, read-only memory, and flash memory.

An operator interface 24 provides for an operator to control the drive vehicle 20. The operator interface 24 can include one or more operator input devices such as a keypad, touchpad, function keys, scroll wheel, gamepad, joystick, or other type of computer input device. The operator interface 24 can include a display screen, such as a conventional liquid crystal display (LCD) or touch screen display.

A system interface 25 is configured to receive signals and/or send signals with one or more remote components. The system interface 25 can include a transceiver that provides for wireless communications with the components. The system interface 25 can also provide for a hard-wired connection with one or more of the components. In one example, the system interface 25 provides for the drive vehicle 20 to be controlled remotely. In one example, control is through a control device 60 that is handled by an operator. The system interface 25 can also communicate with other remote components, such as a system control unit that oversees multiple different aspects of the manufacturing process.

The rotation angle sensor is 30 mounted to the drive vehicle 20 to acquire the angular position of the drive vehicle 20 relative to the platform 100. Various types of rotation angle sensors 30 can be used on the drive vehicle 20, such as but not limited to an absolute encoder or a potentiometer that senses an angle at the pivot point P formed between the mount 21 and/or platform 100 and the body 29. The angle can include a yaw axis angle which is the rotation about a vertical axis that extends through the pivot point P.

One or more distance sensors 40a, 40b measure the distance between the platform 100 and the target object 110. One design includes a pair of distance sensors 40a, 40b spaced apart along the platform 100 to measure distances at different sections of the platform 100. Other designs can include three or more distance sensors 40. Another design includes a single distance sensor 40. The distance sensors 40 are configured to be positioned along or near a leading edge 101 of the platform 100 that faces the target object 110. The distance sensors 40 are further configured to be attached to different locations along the leading edge 101 of the platform 100. This spacing, described by width W, provides for each distance sensor 40 to measure the distance of different sections of the platform 100 away from the target object 110. Each distance sensor 40 can include an attachment member to attach to the platform 100. In one example, one or more of the distance sensors 40 are attached to the target object 110 and detect the approaching platform 100.

A variety of different distance sensors 40 can be used to measure the distance between the platform 100 and the target object 110. Distance sensors 40 can include Lidar sensors with an emitter and a receiver. The emitters emit a pulsed laser light with the receiver configured to receive reflected pulses. The distance sensors 40 can also use various other sensing technologies, including but not limited to laser distance sensors, ultrasonic distance sensors, depth cameras, or radar-based distance measurement sensors. The different distance sensors 40 that are attached to the platform 100 can include the same or different sensing technologies.

Indicator lights 80 are positioned at one or more locations to provide a visual indication to the operator of the operational states of the drive vehicle 20. Positions for the indicator lights 80 include but are not limited to one or more of the drive vehicle 20, platform 100, control device 60, workspace surrounding the target object 110, and the target object 110. In one example, the indicator lights 80 illuminate in different colors with each color representing a different operational state of the drive vehicle 20, such as a first color (e.g., yellow) for a normal state, a second color (e.g., pink) for a rotate only state, a third color (e.g., orange) for a reverse only state, and fourth color (e.g., green) for a forward only state.

In one example, the control unit 95 is mounted to the drive vehicle 20. The control unit 95 operates based on one or more inputs from the control device 60 and/or operator interface 24. In another example, the control unit 95 is positioned away from the drive vehicle 20, such as within the control device 60 as illustrated in FIG. 2. In one example when the control unit 95 is located remotely from the drive vehicle 20, the drive vehicle 20 includes basic circuitry to send and receive signals from the control unit 95 and operate the one or more motors 27 to drive and steer the drive vehicle 20.

Figure 4:
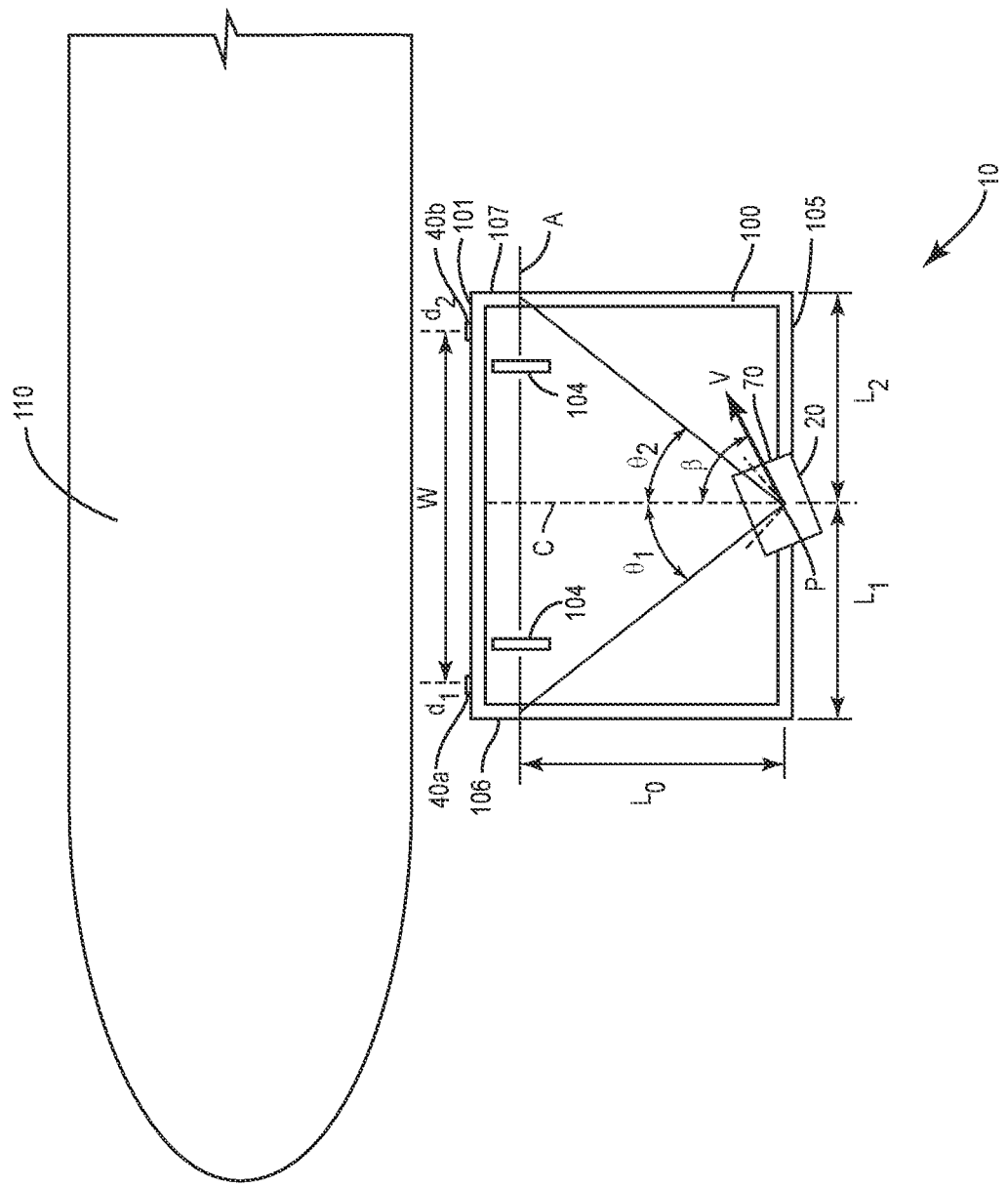
FIG. 4 is a top view 2D diagram of critical angle ranges of a platform positioned in proximity to a target object.

FIG. 4 illustrates the drive vehicle 20 connected to the platform 100 at the pivot point P. The platform 100 includes a leading edge 101 that faces towards the target object 110 and an opposing trailing edge 105. The platform 100 further includes a pair of wheels 104 aligned along an axis A. In one example, at least one of the wheels 104 is locked in a specific angular position relative to a vertical axis to prevent vertical axis rotational motion (castering) of that wheel. This motion constraint enables the entire platform 100 to rotate about a point on axis A when driven by the drive vehicle 20. A pair of distance sensors 40a, 40b are attached at the leading edge 101 of the platform 100 and positioned apart by a width W. A length L0 extends between the axis A and the pivot point P. Lengths L1 and L2 are measured between pivot point P and the respective lateral extents 106 and 107 of the platform 100. The lateral extents 106 and 107 are the furthest physical lateral (e.g., left and right) points of the platform 100 at or in proximity to the leading edge 101 with respect to the pivot location. These extents 106, 107 are the first points that would contact the target object 110 during rotation of the platform 100. A reference line C, from which the relative rotation angle between the drive vehicle 20 and platform 100 will be measured, extends through the platform 100 at the pivot point P and through the leading and trailing edges 101, 105. In one example, the pivot point P is centered between the lateral extents 106, 107 and the line C is centered along the platform 100, in which case L1 is equal in length to L2. In another example, C is not centered along the leading edge 101, and L1 is not the same length as L2. In another example, the line C is perpendicular to one or both of the leading and trailing edges 101, 105.

The control unit 95 receives directional command inputs from an operator to move the drive vehicle 20 and also various inputs from the sensors 30, 40. Based on the dimensions of the platform 100, the directional command inputs, the sensor inputs including distance from the target object 110 and relative angular position of the drive vehicle 20 relative to the platform 100, the control unit 95 uses algorithms stored in software 97 in the memory circuitry 23 to determine allowable movements that move the drive vehicle 20 such that the platform 100 does not contact against the target object 110.

FIG. 4 illustrates a drive vehicle 20 that is attached to a platform 100 with the drive vehicle 20 and platform 100 in proximity to a target object 110. The distance sensors 40a, 40b measure distances between the platform 100 and the target object 110. The first distance sensor 40a measures a distance d1 between the distance sensor 40a and the target object 110, while the second distance sensor 40b measures a distance d2 between distance sensor 40b and the target object 110. The drive vehicle 20 is pivotally connected to the platform 100 at the pivot point P. An angle β is formed between the line C and a direction of travel of the drive vehicle 20.

A critical angle range is defined with respect to line C and is determined based on the dimensions of the platform 100. The critical angle range includes a first critical angle θ1 defined as:

$$\theta 1 = \tan(L1/L0) \quad \text{(Eq. 1)}$$

The critical angle range also includes a second critical angle θ2 defined as:

$$\theta 2 = -\tan(L2/L0) \quad \text{(Eq. 2)}$$

For purposes of the calculations, angles in a counter-clockwise direction from the line C are positive, and angles extending from the line C in a clockwise direction are negative.

Figure 5:
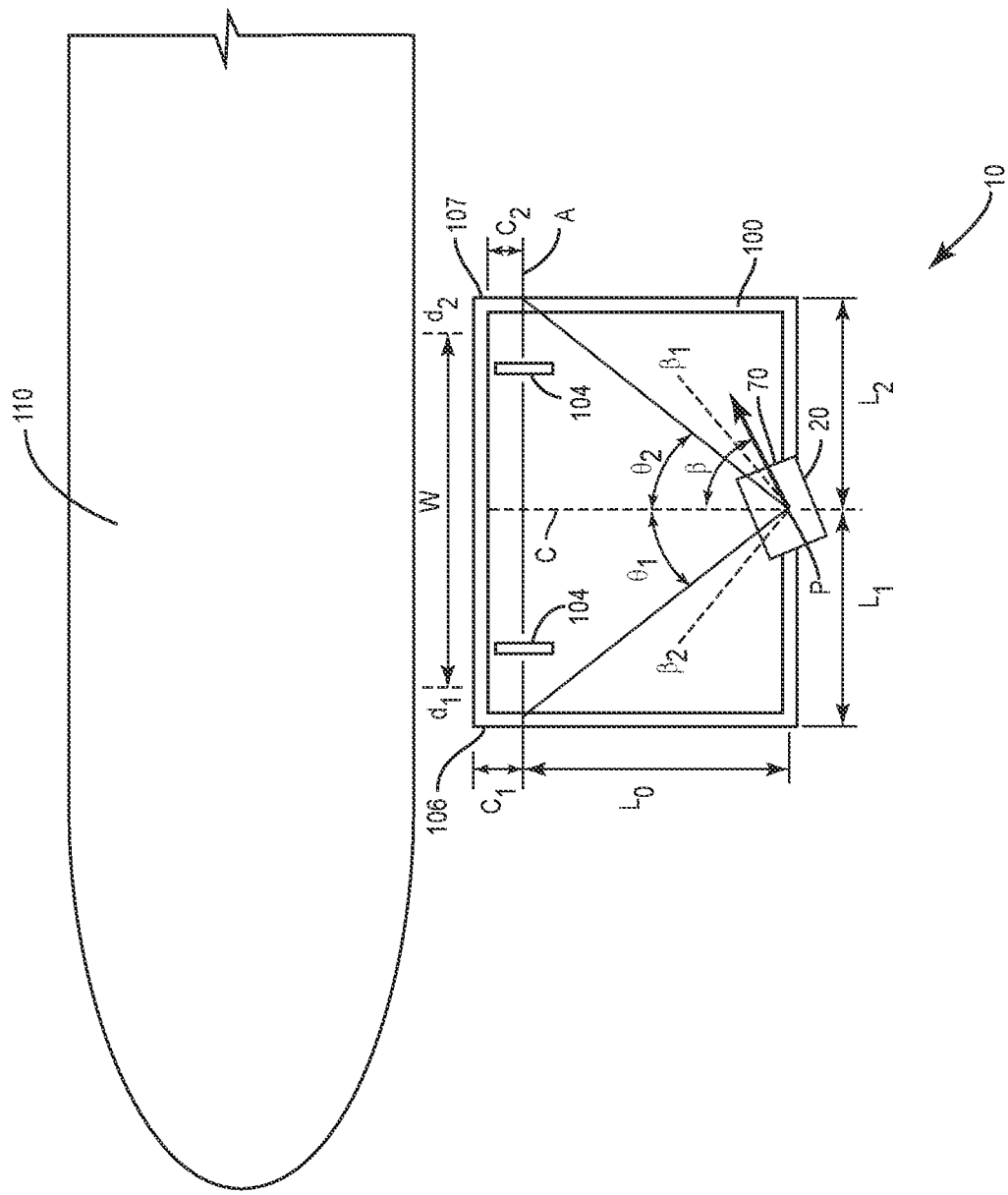
FIG. 5 is a top view 2D diagram of allowable heading angles of a platform.

As illustrated in FIG. 5, heading angle limits β1 and β2 are also calculated that define acceptable limits of movement of the drive vehicle 20 that will move the platform 100 without causing contact between the platform 100 and target object 110. The heading angle limits β1, β2 are defined based on the critical angles θ1, θ2.

$$\beta 1 = \theta 1 - 90° \quad \text{(Eq. 3)}$$

$$\beta 2 = \theta 2 + 90° \quad \text{(Eq. 4)}$$

Motion constraint equations are further calculated to determine whether the drive vehicle 20 can move in the requested direction based on the heading angle limits β1, β2. The motion constraint equations include:
if (β>β1) and (β<β2), restrict forward (FWD) motion and allow reverse (REV) motion; and
if (β>β1+180°) and (β<β2−180°), restrict reverse (REV) motion and allow forward (FWD) motion.

Figure 6:
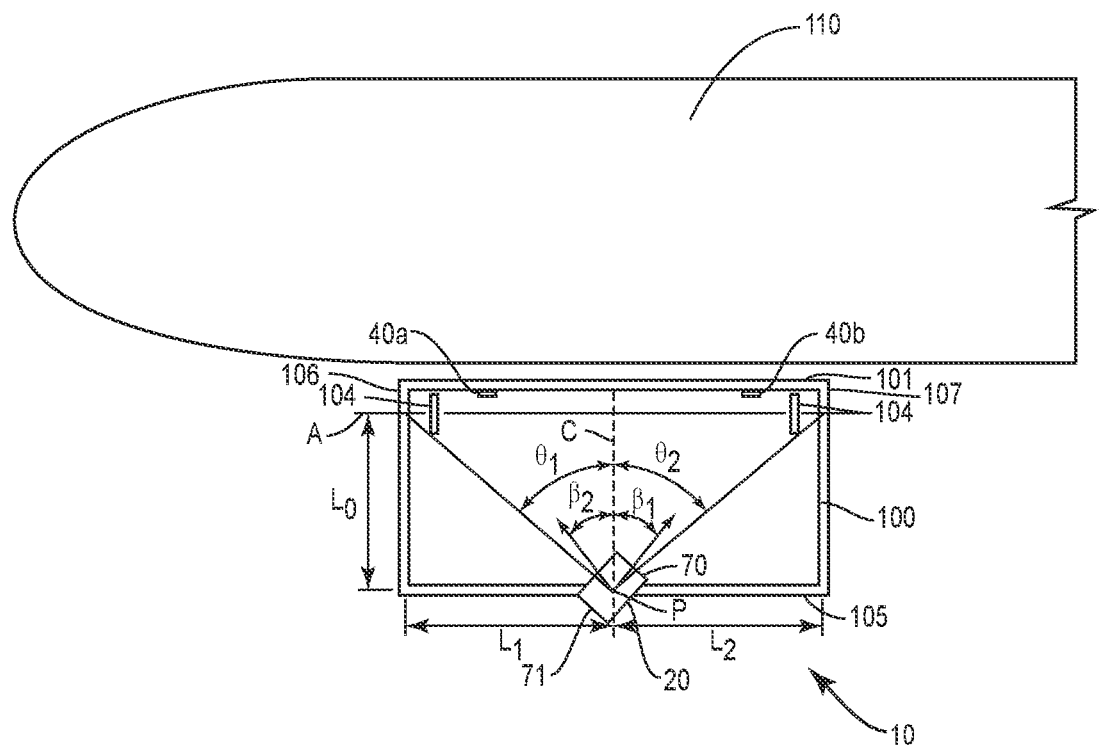
FIG. 6 is a top view 2D diagram of allowable heading angles of a platform.

FIG. 6 illustrates an example of a drive vehicle 20 that has moved a platform 100 into proximity of a target object 110. In this position, both distance sensors 40a, 40b detect the presence of the target object 110. In this example, the platform 100 includes a relatively large width measured between the lateral extents 106, 107. The lengths L1, L2 are large relative to the length L0. In this example, the heading angle limits β1, β2 are relatively narrow (as opposed to FIG. 5 that illustrates an example in which heading angle limits β1, β2 extend outward beyond the critical angles θ1, θ2).

Figure 6A:
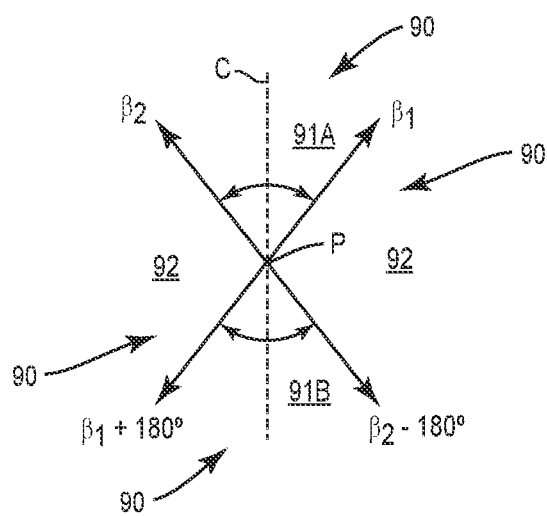
FIG. 6A is a diagram of zones of the platform of FIG. 6 including allowable zones and prohibited zones.

As illustrated in FIG. 6A, the motion constraint equations define lines that overlap at point P and define four zones 90. Of the four zones 90, two are allowable zones 91A, 91B that allow for movement, and two are prohibited zones 92 in which forward and reverse motion is not allowed. In one example using the motion constraint equations, the drive vehicle 20 is able to move in reverse when the front 70 is facing within allowable zone 91A and is able to move forward when the front 70 is facing within allowable zone 91B. Forward or reverse motion of the drive vehicle 20 is not allowed when the front 70 is facing within either of prohibited zones 92. Rotational movement of the drive vehicle 20 would be allowed when the drive vehicle 20 is facing within either of the prohibited zones 92.

Figure 7:
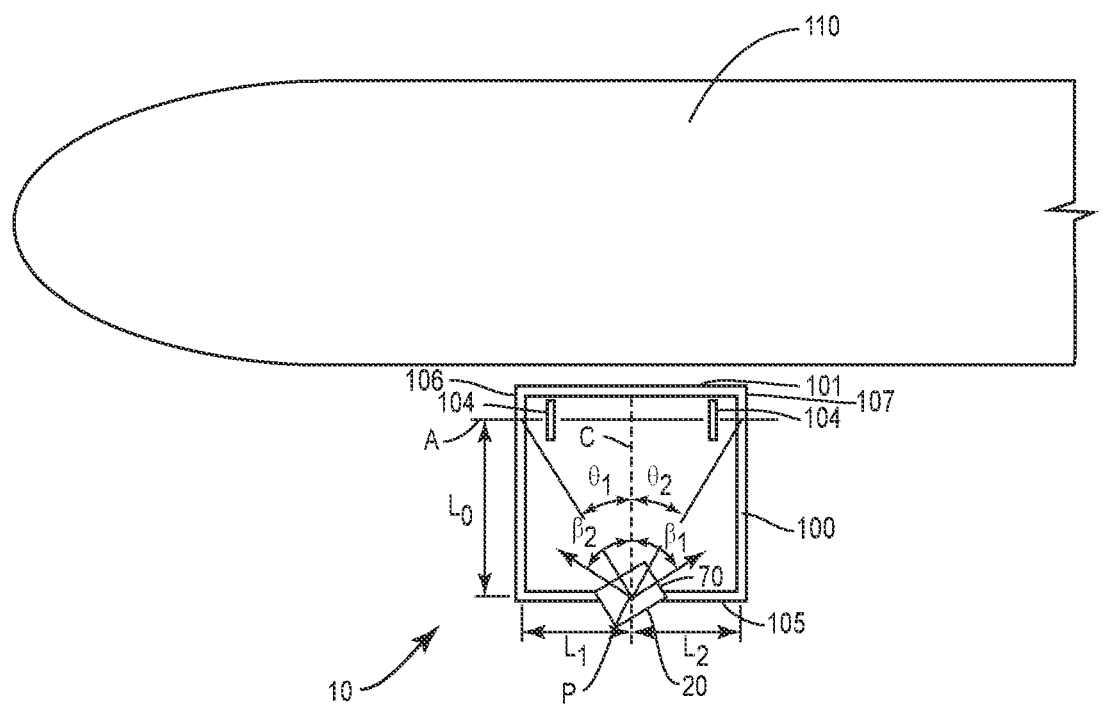
FIG. 7 is a top view 2D diagram of allowable heading angles of a platform.
Figure 7A:
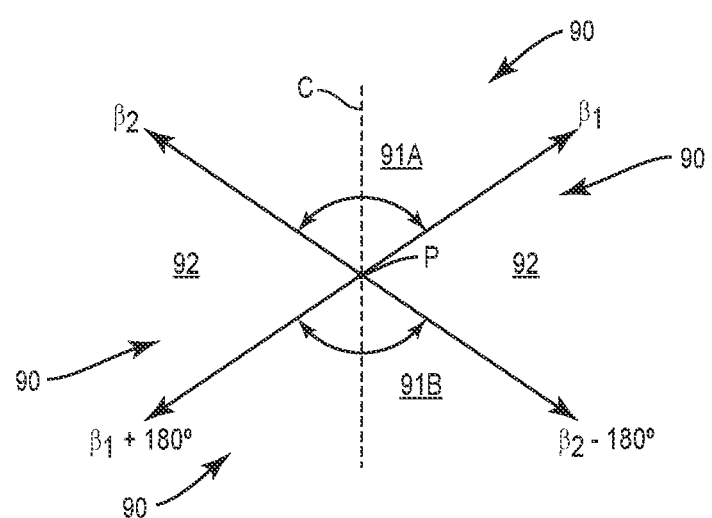
FIG. 7A is a diagram of zones of the platform of FIG. 7 including allowable zones and prohibited zones.

FIG. 7 illustrates an example in which the platform 100 includes a relatively small width measured between the lateral extents 106, 107 relative to a length L0. In this example, the heading angle limits β1, β2 are wider than the critical angles θ1, θ2. As illustrated in FIG. 7A, the motion constraints define the zones 90 in which particular motion is allowed for the drive vehicle 20 in allowable zones 91A, 91B, and not allowed in prohibited zones 92. The drive vehicle 20 would be able to move in reverse when the front 70 is facing within allowable zone 91A and would be able to move forward when the front 70 is facing within allowable zone 91B. Forward or reverse motion of the drive vehicle 20 would not be allowed when the front 70 is facing within either of prohibited zones 92 (although rotational movement of the drive vehicle 20 would be allowed).

In one example such as illustrated in FIGS. 6 and 6A, β1 is −40° and β2 is 40°. In another example such as illustrated in FIGS. 7 and 7A, β1 is −60° and β2 is 60°.

The examples disclosed above include situations in which two of the distance sensors 40a, 40b each detect the presence of the target object 110. That is, each of the distance sensors 40a, 40b are within a predetermined distance of the target object 110. Situations can also occur in which a single distance sensor 40 detects the presence of the target object 110.

Figure 8:
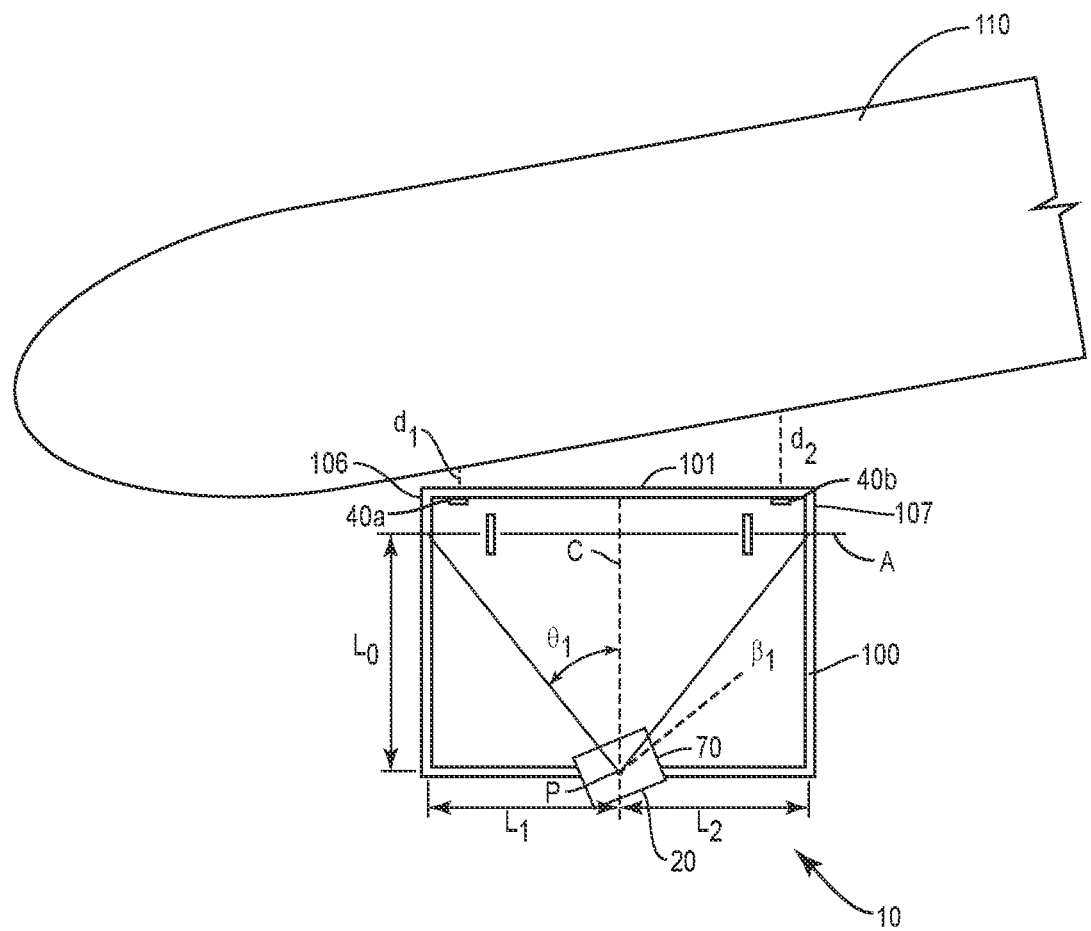
FIG. 8 is a top view 2D diagram of a single heading angle of a drive vehicle with a single distance sensor detecting the target object within a predetermined threshold.
Figure 8A:
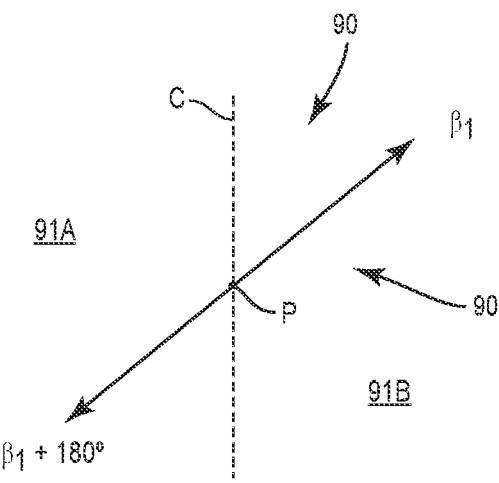
FIG. 8A is a diagram of allowable zones of the platform of FIG. 8.

FIGS. 8 and 8A illustrate an example in which the leading edge 101 of the platform 100 is not evenly aligned with the target object 110. In this example, distance sensor 40a is in closer proximity to the target object 110 than distance sensor 40b. In one example, distance sensor 40b does not detect the target object 110 at distance d2. In another example, distance sensor 40b detects the target object 110, but the distance d2 is beyond a predetermined distance threshold in which the processing circuit 22 calculates allowable heading angles. With a single sensor detection with distance sensor 40a, a single critical angle θ1 and a single heading angle limit β1 is determined. As illustrated in FIG. 8A, a graph includes a single line formed by β1 and β1+180°. The single line defines zones 90 that dictate the allowable directional movements of the drive vehicle 20. The drive vehicle 20 is allowed to move in a reverse direction when the front 70 is facing into allowable zone 91A (and prevented from moving in a forward direction). The drive vehicle 20 is allowed to move in a forward direction when the front 70 is facing into allowable zone 91B (and prevented from moving in a reverse direction). In one example, β1 is −50°. The drive vehicle 20 is able to have rotational movement when facing into the different zones 91A, 91B.

Figure 9:
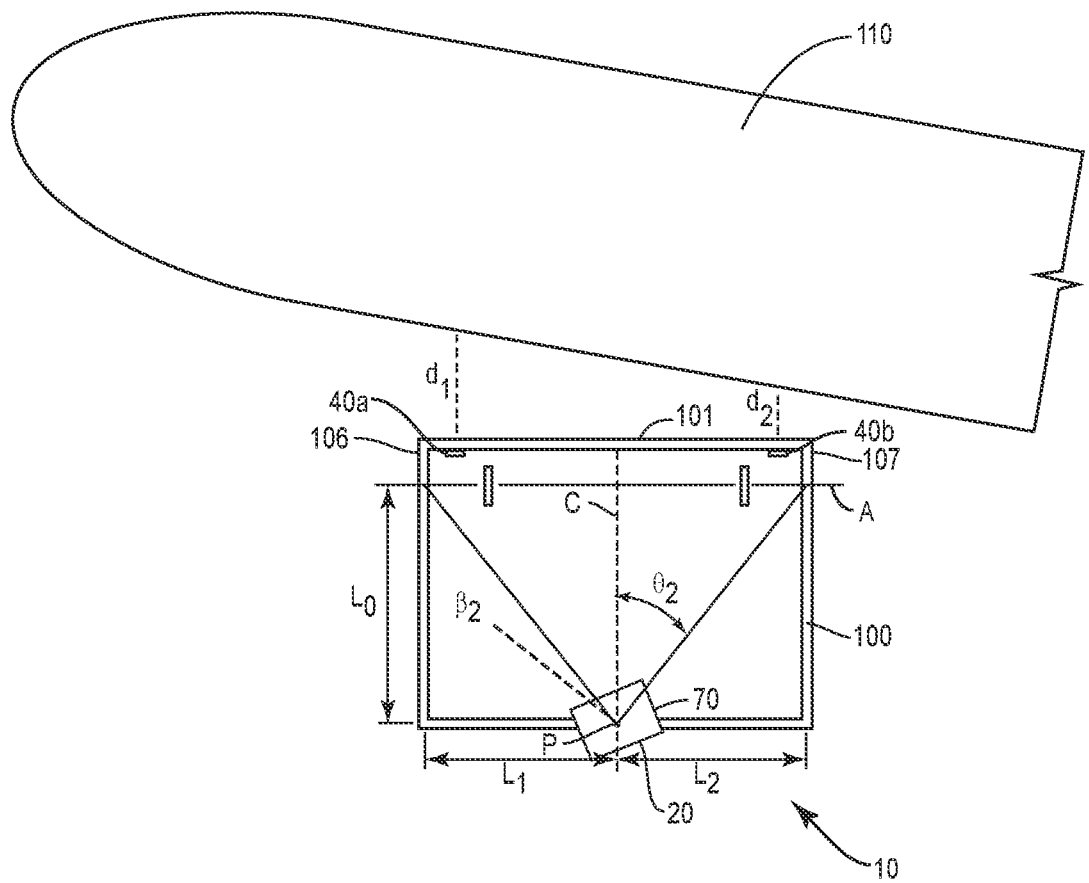
FIG. 9 is a top view 2D diagram of a single heading angle of a drive vehicle with a single distance sensor detecting the target object within a predetermined threshold.
Figure 9A:
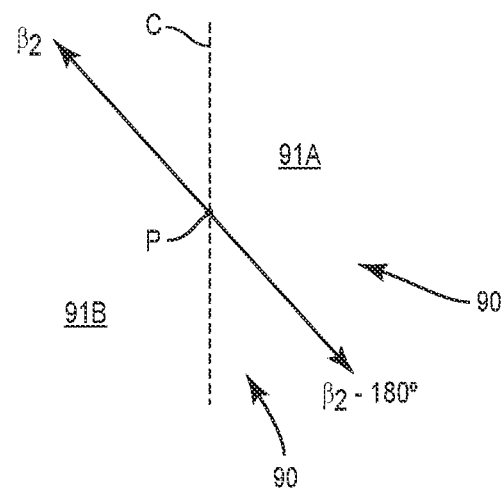
FIG. 9A is a diagram of allowable zones of the platform of FIG. 9.

FIGS. 9 and 9A include an example in which distance sensor 40b detects the target object 110. Distance sensor 40a either does not detect the target object 110 or the distance d1 is beyond a predetermined distance. A single critical angle θ2 and a single heading angle limit β2 is determined. The graph of FIG. 9A includes a single line formed by β2 and β2−180° that defines the zones 90. The drive vehicle 20 is allowed to move in a reverse direction when the front 70 is facing into zone 91A (and prevented from moving in a forward direction). The drive vehicle 20 is allowed to move in a forward direction when the front 70 is facing into zone 91B (and prevented from moving in a reverse direction). In one example, β2 is 40°. The drive vehicle 20 is able to have rotational movement when facing into the different zones 91A, 91B.

The drive vehicle 20 is configured to receive commands to move in various manners relative to the front 70. These can include moving in a forward direction (i.e., in the direction that the front 70 is facing), a reverse direction (i.e., away from the direction that the front 70 is facing), and rotational directions in which the drive vehicle 20 rotates about the point P relative to the platform 100. Further, the drive vehicle 20 can operate in different speed ranges, which are defined by constraints on the upper limit speed allowed in each operating state. A normal state operates with a first upper limit speed, and a slow state operates with a second upper limit speed that is slower than the first upper limit speed. In one example, the drive vehicle 20 is also able to operate at a variety of other states with upper limits that include speeds that are slower than the first upper limit speed. The different states can apply to both forward, reverse, and rotational movements. In one example, the drive vehicle 20 operates in two states: a normal state; and a slow state.

During use, an operator enters commands to move the drive vehicle 20 and the attached platform 100. The commands can be entered through the operator interface 24 on the drive vehicle 20, through the remote control device 60, another remote device, or various combinations. The control unit 95 is configured to determine whether the movements of the drive vehicle 20 can occur. If the movement can occur, the control unit 95 determines the speed at which the movement occurs.

Figure 10:
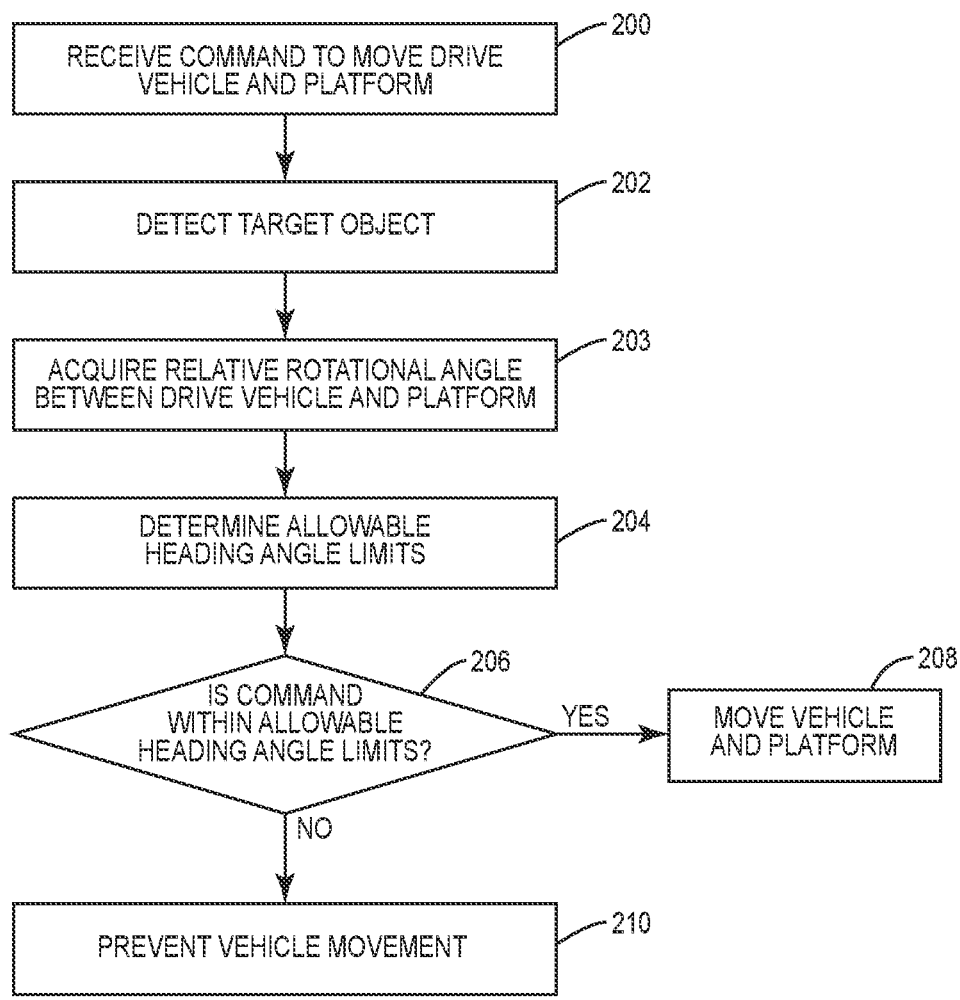
FIG. 10 is a flowchart diagram of a method of a drive vehicle that moves a platform relative to a target object.

FIG. 10 illustrates a method of operating the drive vehicle 20 to move and position the platform 100 relative to the target object 110. The processing circuit 22 receives commands from the operator to direct the drive vehicle 20 and platform 100 towards the target object 110 (block 200). These commands can include various directional commands, including but not limited to rotational directions, forward movement, and reverse movement. When the platform 100 is beyond a threshold from the target object 110, the drive vehicle 20 operates in a first state. During movement of the platform 100, one or more distance sensors 40 positioned on the platform 100 detects the target object 110 when the platform 100 moves to within the distance threshold (block 202). The relative rotational angle of the drive vehicle 20 with respect to the platform 100 is acquired by the rotation angle sensor 30 (block 203). Based on the sensor inputs and the dimensions of the platform 100, the allowable heading angle limits and allowable zones 91 are determined for the drive vehicle 20 (block 204).

The commanded directional heading of the drive vehicle 20 is then compared with the allowable heading angle limits (block 206). If the motion command input by the operator is in an allowed zone 91, the drive vehicle 20 and platform 100 are moved (block 208). For example, the movement is allowed when the direction of movement moves the potential platform contact points away from the target object 110. If the motion command input by the operator is not in an allowed zone 91, the forward or reverse movement of the drive vehicle 20 is prevented (block 210). In one example, the input command would move one or more potential platform contact points towards the target object 110 and the forward and reverse movement is therefore prevented. Movement other than forward or reverse may be allowed (e.g., rotational movement instead of forward or reverse movement) to allow the drive vehicle 20 to change orientation with respect to the platform 100, in order to allow the drive vehicle 20 to achieve a heading angle that is in an allowed zone 91.

Figure 11:
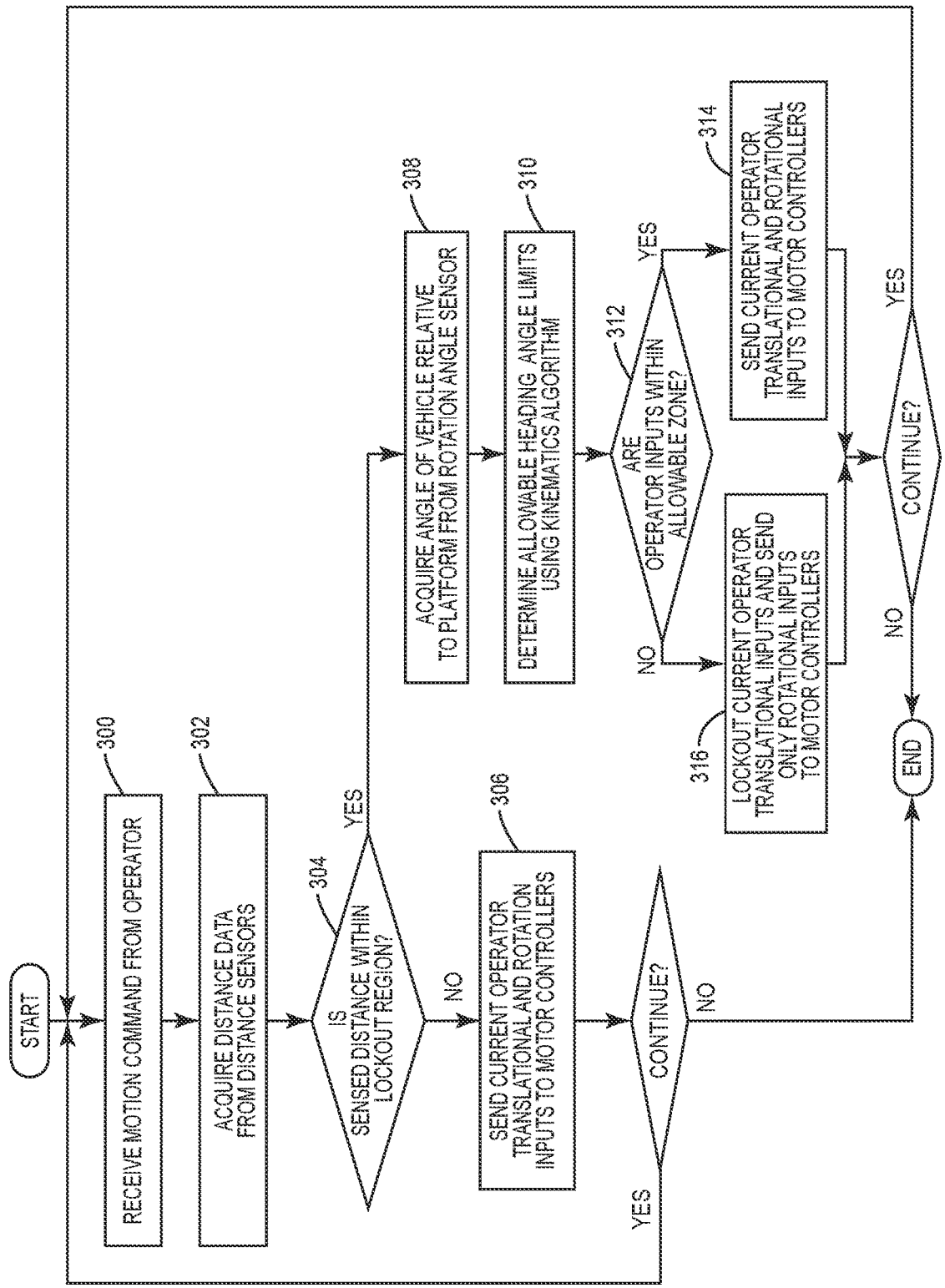
FIG. 11 is a flowchart diagram of a method of a drive vehicle that moves a platform relative to a target object.

FIG. 11 illustrates another method of controlling the movement of the drive vehicle 20. Motion commands are received from the operator to move the drive vehicle 20 and platform 100 (block 300). The distance between the platform 100 and the target object 110 are determined based on input acquired from the one or more distance sensors 40 (block 302). The sensed distance between the platform 100 and target object 110 is compared to a predetermined threshold (block 304). If the distance is not within the threshold, the drive vehicle 20 is moved in the commanded direction (block 306). In one example, this includes the processing circuit 22 sending inputs to motor controllers in the drive vehicle 20 to drive the drive members 28.

If the sensed distance between the platform 100 and the target object 110 is within the threshold (block 304), the relative angle between the drive vehicle 20 and platform 100 is acquired from the rotation angle sensor 30 (block 308) and two or more allowable heading angle limits are determined (block 310). The received heading direction from the operator is compared to the allowable zones 91 (block 312). If the received motion direction is within an allowable zone 91, the drive vehicle 20 is moved as requested by the operator (block 314). If the received motion direction is not within an allowable zone 91, drive vehicle movement in the commanded direction is not allowed (block 316). In one example, the drive vehicle 20 is prevented from moving from the current location but is able to rotate relative to the platform 100.

Figure 12:
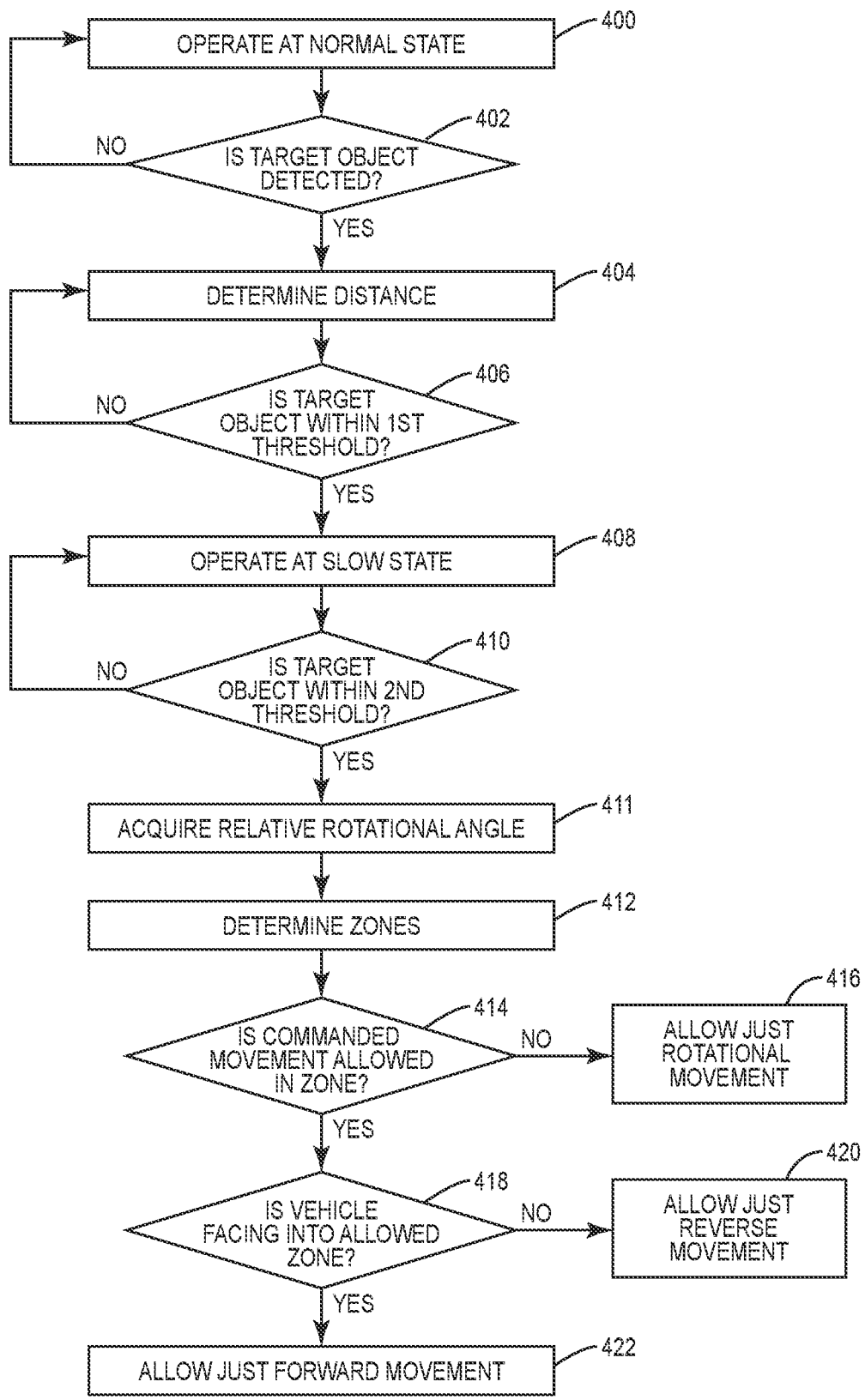
FIG. 12 is a flowchart diagram of a method of a drive vehicle that moves a platform relative to a target object.

FIG. 12 illustrates a method of operating a drive vehicle 20 and moving a platform 100. Initially, the drive vehicle 20 operates at a normal state (with no motion constraints) as the drive vehicle 20 is not within proximity to the target object 110 (block 400). During the normal state, the distance sensors 40 are active to detect the target object 110 and the drive vehicle 20 moves at a first upper limit speed. During the normal state, the indicator lights 80 are illuminated a first color (e.g., yellow) to indicate to the operator that the drive vehicle 20 is operating in this normal state. In one example, the normal state occurs when the drive vehicle 20 is beyond a predetermined distance away from the target object 110.

The processing circuit 22 monitors the distance sensors 40 to detect the target object 110 (block 402). As the drive vehicle 20 moves the platform 100, eventually one or more of the distance sensors 40 detect the target object 110 while the drive vehicle 20 is operating in the normal state. Once detected, the distance to the target object 110 is determined (block 404). The distance is compared to a first threshold (block 406). If the distance is above the first threshold, the drive vehicle 20 continues to operate in the normal state at the first upper limit speed. When the distance to the target object 110 is within a first threshold value, the drive vehicle 20 enters into a slow state in which the drive vehicle 20 operates at a slower upper limit speed (block 408). While the drive vehicle 20 is within the first threshold distance, the drive vehicle 20 is unable to operate at a speed above the slow upper limit speed. Further, the indicator lights 80 change to a different color to indicate to the operator that the drive vehicle 20 is approaching the target object 110.

While operating at the slower upper limit speed, the distance to the target object 110 is monitored (block 410). If the drive vehicle 20 is still outside of a second threshold, the drive vehicle 20 continues to operate at the slower upper limit speed. When the drive vehicle 20 moves the platform 100 within the second threshold, the relative rotational angle between the drive vehicle 20 and platform 100 is acquired from the rotation angle sensor 30 (block 411) and zones 90 are determined by the processing circuit 22 (block 412). In one example, a single distance sensor 40 detects the target object 110 resulting in the calculation of two zones 90. In another example, both distance sensors 40 detect the target object 110 resulting in the calculation of four zones 90. The indicator lights 80 also change to a different color once the platform 100 moves to within the second threshold of the target object 110.

The processing circuit 22 then determines whether the commanded movement is within an allowable zone 91 (block 414). If the commanded movement is not within an allowable zone 91, the movement is not allowed and the movement stops. In one example, the drive vehicle 20 is allowed to just have rotational movement (block 416). The indicator lights 80 change to a different color (e.g., magenta) to indicate to the operator that the movement is limited to just rotational movement.

When the commanded movement is within an allowable zone 91, the drive vehicle direction is determined (block 418). If the drive vehicle 20 is facing away from an allowable zone 91 (i.e., the front 70 is facing towards a prohibited zone 92), the drive vehicle movement is limited to just reverse movement (block 420). The indicator lights 80 may change to another color (e.g., orange) to indicate the reverse movement. In one example, the drive vehicle 20 is also able to rotate.

When the drive vehicle 20 is facing an allowable zone 91, the drive vehicle movement is limited to just forward movement (block 422). The indicator lights 80 may change to another color (e.g., green) to indicate the allowed forward movement. In one example, the drive vehicle 20 is also able to rotate.

In one example, the processing circuit 22 performs angle and movement calculations once the drive vehicle 20 and platform 100 move within the second threshold distance. The processing circuit 22 receives data from the rotation angle sensor 30 and uses the kinematics algorithm software 97 stored in the memory circuit 23 to determine the relative angle of the drive vehicle 20 to the platform 100. This can include the drive vehicle heading direction (e.g., drive vehicle directly facing platform 100, 180° from facing platform 100, etc.).

The processing circuit 22 uses the kinematics equations of the software 97 to determine the allowable heading angle limits and zones 90 for the drive vehicle 20, including the one or more allowable zones 91 and one or more prohibited zones 92. If the motion command input by the operator is in an allowable zone 91 (i.e. moves potential platform contact points away from the target object 110), the processing circuit 22 allows the movement of the drive vehicle 20 and the resulting platform movement. But if the motion command input by the operator is not in an allowed movement zone 91 (i.e. moves potential platform contact points towards the target object 110), the processing circuit 22 does not allow the movement and the drive vehicle 20 and the platform 100 position is not changed. The processing circuit 22 may allow rotational movement of the drive vehicle 20 to change the orientation of the drive vehicle 20.

Figure 13:
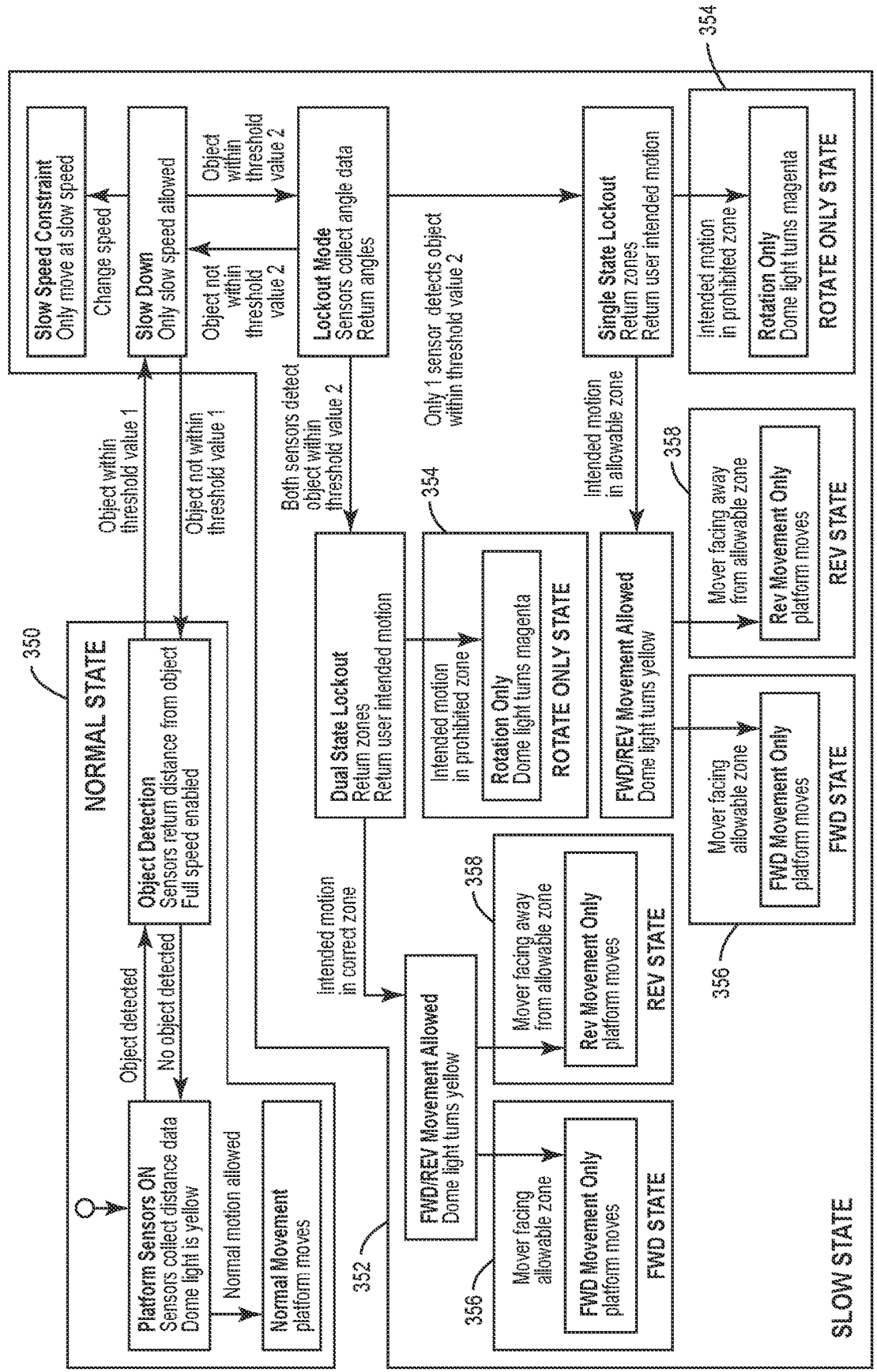
FIG. 13 is a diagram of operational states of a drive vehicle during operation of moving a platform.

FIG. 13 is a state machine transition diagram indicating different states that the drive vehicle 20 operates in during movement of the platform 100. This example includes two distance sensors 40a, 40b attached to the platform 100 and a single rotation angle sensor 30.

Initially, the drive vehicle 20 operates in a normal state (block 350). The indicator lights 80 are a first color (e.g., yellow) indicating to the operator that the drive vehicle 20 is operating in the normal state with normal movement of the drive vehicle 20. The distance sensors 40a, 40b collect distance data and while the platform 100 is spaced away from the target object 110 the drive vehicle 20 operates up to full upper limit speed. In one example, the full upper limit speed is the maximum speed of the drive vehicle 20.

The drive vehicle 20 transitions to a slow state (block 352) when the target object 110 is detected to be within a first threshold distance. The slow state provides for the drive vehicle 20 to operate at a slower upper limit speed than the normal state. The extent of the decrease in speed can vary with various speed settings available for use. While operating in the slow state, the distance sensors 40a, 40b continue to collect distance data regarding the distance the platform 100 is spaced away from the target object 110.

While operating in the slow state, the platform 100 moves to within a second threshold distance of the target object 110. Upon moving to within the second threshold distance of the target object 110, the drive vehicle 20 is in a lockout mode with the rotation angle sensor 30 acquiring angle data. The control unit 95 determines heading angle limits and corresponding zones 90.

During operation when just one distance sensor (e.g., 40a) detects that the platform 100 is within the second threshold distance, the drive vehicle 20 operates in a single state lockout mode. The control unit 95 determines the zones 90 and compares these with the commanded motion received from the operator. In the single state lockout mode, when the commanded motion received by the operator is in a prohibited zone 92, the drive vehicle 20 transitions to a rotate only state (block 354). The indicator lights 80 also change to a different color (e.g., magenta) to indicate the rotate only state to the operator.

In another example when the drive vehicle 20 is operating in the single state lockout mode, the commanded motion received from the operator is within an allowable zone 91. The indicator lights 80 change color (e.g., yellow) indicating that the drive vehicle 20 is able to move in forward and reverse directions.

When the drive vehicle 20 is facing into an allowable zone 91, the drive vehicle 20 transitions to a forward state (block 356) and is able to operate only in the forward direction. When the drive vehicle 20 is facing away from an allowable zone 91, the drive vehicle 20 transitions to a reverse state (block 358) in which only reverse movement is allowed.

In another example when the drive vehicle 20 is in the slow state and within the lockout mode, both sensors 40a, 40b detect that the platform 100 is within a second threshold value. The drive vehicle 20 then operates in a dual state lockout mode with the control unit 95 determining the zones 90 and comparing against the commanded motion received from the operator. When the control unit 95 determines that the commanded motion is into a prohibited zone 92, the drive vehicle 20 transitions to the rotate only state (block 354). The indicator lights 80 change color (e.g., magenta) indicating to the operator that the drive vehicle 20 is in the rotate only state.

In another example, when the drive vehicle 20 is in the dual state lockout mode and the intended motion from the operator is within an allowable zone 91, the drive vehicle 20 is able to operate in forward and reverse. When the drive vehicle 20 is facing into an allowable zone 91, the drive vehicle 20 transitions to the forward state (block 356) that allows for just forward movement. When the drive vehicle 20 is facing away from an allowable zone 91, the drive vehicle 20 transitions to the reverse state (block 358) that only provides for reverse movement.

Figure 14:
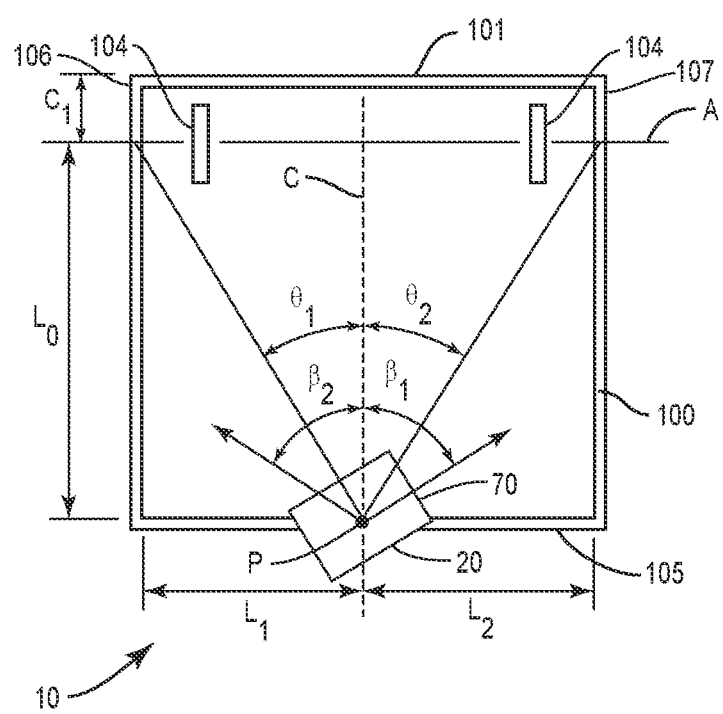
FIG. 14 is a top view 2D diagram of a platform with wheels that are adjustable.

In one example, the platform 100 includes wheels 104 that are aligned along an axis A on which the platform 100 pivots. As illustrated in FIG. 1, the wheels 104 are fixed to the platform 100 such that the axis A remains fixed relative to the platform 100. In another example as illustrated in FIG. 14, the configuration of wheels 104 may be adjusted relative to the platform 100. In one example, the wheels 104 are on casters to move positions. In another example, the wheels 104 are on slides and are movable along a length of the platform 100. As illustrated in FIG. 14, the axis A can be changed a distance C1 relative to the distance Lo. With the adjustable position, the critical angles are calculated as follows:

$$\theta1 = \tan(L1/(L0 \pm C1)) \quad \text{(Eq. 5)}$$

The critical angle range also includes a second critical angle $\theta2$ defined as:

$$\theta2 = -\tan(L2/(L0 \pm C1)) \quad \text{(Eq. 6)}$$

The heading angle limits $\beta1, \beta2$ are defined based on the critical angles $\theta1, \theta2$, as described in Eqs. 3 and 4, and the variations in the resulting heading limits due to the $\pm C1$ variable are referred to as $\beta1+$ and $\beta1-$, and $\beta2+$ and $\beta2-$. The adjustability of the wheels 104 also affects the position and size of the zones 90, which will be described next.

Figure 15:
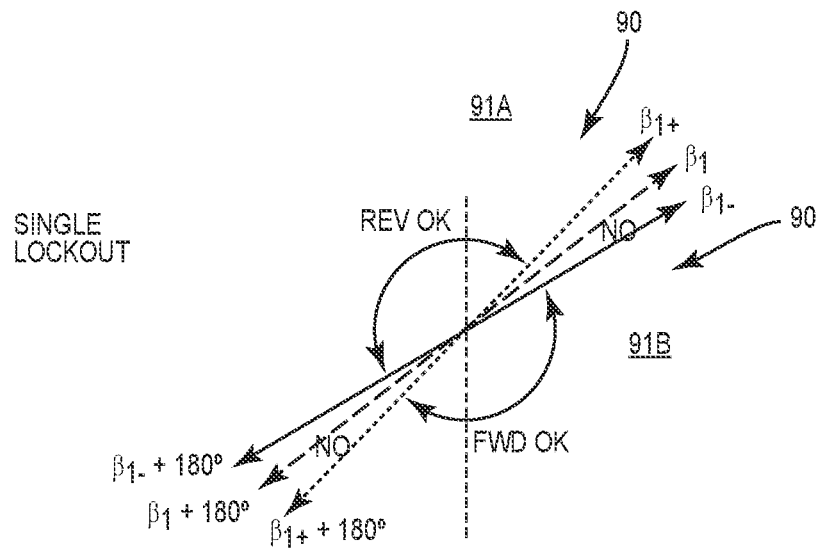
FIG. 15 is a diagram of allowable zones of a platform with an adjustable pivot axis location with a single distance sensor detecting the target object within a predetermined threshold.

FIG. 15 illustrates an example in which a single distance sensor 40a detects the target object 110. For example, a distance sensor 40a detects the target object 110 while distance sensor 40b does not detect the target object 110. With a single sensor detection with distance sensor 40a, a single critical angle $\theta1$ and a single heading angle limit $\beta1$ is determined, with the related variations $\beta1+$ and $\beta1-$, due to the addition or subtraction of the C1 variable. As illustrated in FIG. 15, a graph includes multiple variations in heading angle limits each determined based on the location of the axis A. The heading angle limits define zones 90 that determine the allowable directional movements of the drive vehicle 20. The drive vehicle 20 is allowed to move in a reverse direction when the front 70 is facing into allowable zone 91A (and prevented from moving in a forward direction). The drive vehicle 20 is allowed to move in a forward direction when the front 70 is facing into allowable zone 91B (and prevented from moving in a reverse direction). Rotational movement is allowed when the drive vehicle 20 is facing into either of the zones 91A, 91B.

Figure 16:
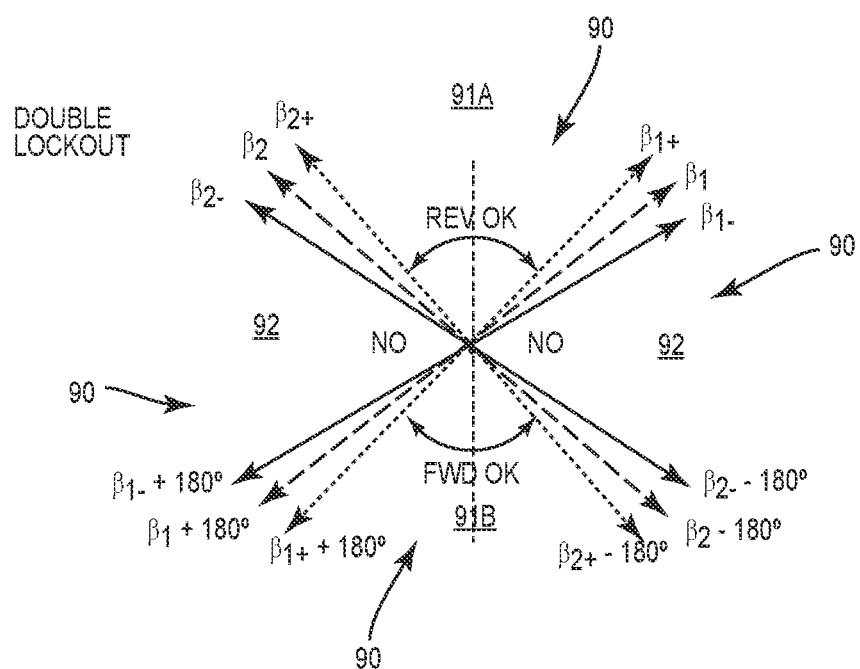
FIG. 16 is a diagram of allowable zones of a platform with an adjustable pivot axis location with a pair of distance sensors detecting the target object within a predetermined threshold.

FIG. 16 illustrates an example in which both distance sensors 40a, 40b detect the target object 110. Multiple variations in heading angle limits are defined based on the position of the axis A, due to the offset variable C1. With both distance sensors 40a, 40b detecting the target object 110, two critical angles $\theta1, \theta2$ are computed and two heading angle limits $\beta1, \beta2$ are determined, along with the related variations $\beta1+$ and $\beta1-$, $\beta2+$ and $\beta2-$, due to the addition or subtraction of the C1 variable. As illustrated, the motion constraints define the zones 90 in which particular motion is allowed for the drive vehicle 20 in allowable zones 91A, 91B, and not allowed in prohibited zones 92. The drive vehicle 20 would be able to move in reverse when the front 70 is facing within allowable zone 91A and would be able to move forward when the front 70 is facing within allowable zone 91B. Motion of the drive vehicle 20 would not be allowed when the front 70 is facing within either of prohibited zones 92. Rotational movement is allowed when the drive vehicle 20 is facing into any of the zones 91A, 91B, 92.

Figure 17:
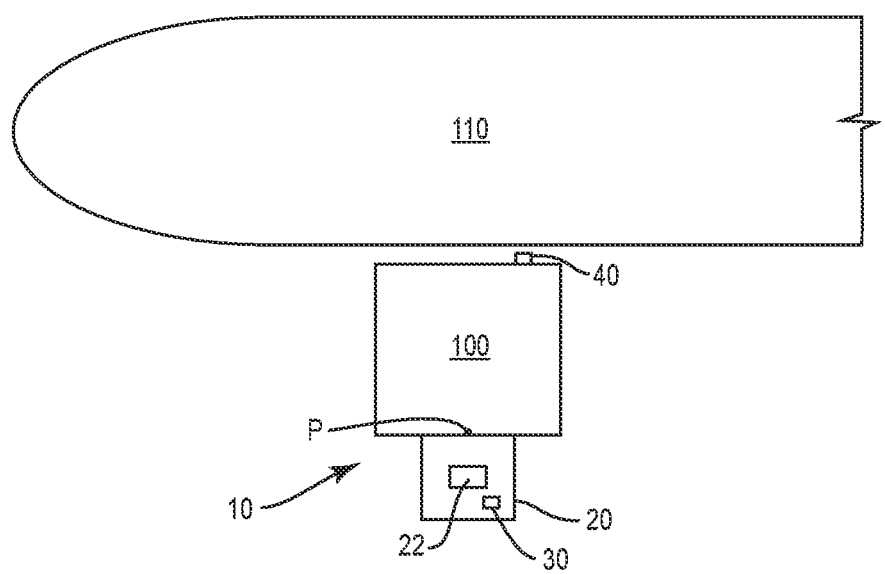
FIG. 17 is a top view 2D diagram of a system to move a platform relative to a target object.

FIG. 17 illustrates a schematic diagram of a system to move a platform 100 relative to a target object 110. The system 10 includes a drive vehicle 20 configured to attach to the platform 100 and to move the platform 100 relative to the target object 110. One or more distance sensors 40 are positioned to sense the target object 110, and a rotation angle sensor 30 acquires the angular position of the drive vehicle 20 relative to the platform 100. A processing circuit 22 controls the movement and calculates a distance between the platform 100 and the target object 110 based on inputs from the one or more distance sensors 40 and rotation angle sensors 30. Based on dimensions of the platform 100 and a position of the pivot point P at which the drive vehicle 20 is attached to the platform 100, the processing circuit 22 calculates heading angle limits in which the drive vehicle 20 can move the platform 100 relative to the target object 110 that avoids contact between the platform 100 and the target object 110. The processing circuit 22 allows the drive vehicle 20 to move in a first direction with a first relative heading angle that is within an allowable zone 91 formed between the allowable heading angle limits and prevent the drive vehicle 20 from moving in a second direction with a second relative heading angle that is outside of the allowable zone 91 formed between the allowable heading angle limits.

The mover system 10 is configured to accommodate a variety of different platforms 100 in a variety of contexts. The examples above include a platform 100 configured to support and position workers and/or equipment within proximity to a target object 110, such as a workpiece on which work is to be performed. Another example of a platform 100 is a trailer that includes wheels that provide for the trailer to be moved by a drive vehicle 20. In various other examples, the platform 100 is a passive device that is configured to be moved by a drive vehicle 20.

The present embodiments may be carried out in other ways than those specifically set forth herein without departing from essential characteristics of the systems and methods. The present embodiments are to be considered in all respects as illustrative and not restrictive, and all changes coming within the meaning and equivalency range of the appended claims are intended to be embraced therein.

What is claimed is:

1. A system to move a platform relative to a target object, the system comprising:
    a drive vehicle configured to attach to the platform at a pivot point and to move the platform relative to the target object;
    one or more distance sensors to sense at least one distance between a leading edge of the platform and the target object;
    one or more rotation angle sensors to measure a relative rotation angle at the pivot point between the drive vehicle and the platform; and
    a processing circuit configured to determine directional movements of the platform and the drive vehicle relative to a center line that extends through a center of the leading edge and the pivot point, the processing circuit further configured to:
        determine the at least one distance between the leading edge of the platform and the target object based on inputs from the one or more distance sensors;
        based on dimensions of the platform, a position of the pivot point relative to the platform, the inputs from the one or more distance sensors, and inputs from the one or more rotation angle sensors, determine a plurality of heading angle limits relative to the center line in which the drive vehicle can safely move the platform relative to the target object while avoiding contact between the platform and the target object, the plurality of heading angle limits defining at least a first allowable zone and a second allowable zone opposing the first allowable zone;
        allow the drive vehicle to move in a first direction with a first relative heading angle that is within one of the first and second allowable zones and move the platform without contacting the platform against the target object; and
        prevent the drive vehicle from moving in a second direction with a second relative heading angle that is outside of the first and second allowable zones.

2. The system of claim 1, wherein the processing circuit is further configured to move the drive vehicle at or less than a first upper limit speed when the leading edge of the platform is located beyond a threshold distance from the target object and to move the drive vehicle at or less than a slower second upper limit speed when the leading edge of the platform is located within the threshold distance from the target object.

3. The system of claim 2, further comprising a plurality of indicator lights that illuminate in a first color when the drive vehicle is able to move at the first upper limit speed and illuminate in a different second color when the drive vehicle is unable to move at the first upper limit speed.

4. The system of claim 1, wherein the first allowable zone is for just forward movement of the drive vehicle, and the second allowable zone for just reverse movement of the drive vehicle.

5. The system of claim 4, wherein the plurality of heading angle limits further define a pair of prohibited zones, and the processing circuit is further configured to restrict directional movements of the drive vehicle within the prohibited zones.

6. The system of claim 5, wherein the drive vehicle is configured to operate in a rotate-only state when directional movements of the drive vehicle are within the prohibited zones.

7. The system of claim 1, wherein the processing circuit is further configured to determine that the platform is farther than a predetermined distance from the target object and allow the drive vehicle to move in any direction based on determining that the platform is farther than the predetermined distance from the target object.

8. The system of claim 1, wherein the pivot point allows for the drive vehicle to be positioned at different angular orientations relative to the platform.

9. The system of claim 1, wherein the drive vehicle comprises a body, a plurality of drive members connected to the body and configured to move along a work floor, one or more motors to drive the plurality of drive members, and a mount attached to the body to connect to the platform.

10. The system of claim 1, wherein the processing circuit is positioned within the drive vehicle.

11. A system to move a platform relative to a target object, the system comprising:
    a drive vehicle configured to pivotably attach to the platform at a pivot point and to move the platform relative to the target object; and
    a processing circuit configured to:
        determine at least one distance between a first edge of the platform and the target object;
        acquire an angular position of the drive vehicle relative to the platform;
        determine a plurality of heading angle limits in which the drive vehicle can move the platform relative to the target object, the plurality of heading angle limits defined relative to a center line that extends through the pivot point and the first edge of the platform;

determine a plurality of zones that are spaced around the pivot point with the plurality of zones being bounded by the plurality of heading angle limits, the plurality of heading angle limits defining outer extents of directional movement of the drive vehicle, with a first set of the plurality of zones being allowable zones in which the drive vehicle can move without causing the platform to contact the target object;

receive at least one command to move the drive vehicle;

determine that commanded drive vehicle movement in a first direction is within one of the allowable zones and move the drive vehicle in the first direction while avoiding contact between the platform and the target object; and determine that commanded drive vehicle movement in a second direction is not within one of the allowable zones and prevent the drive vehicle from moving in the second direction.

12. The system of claim 11, further comprising one or more distance sensors configured to attach to the platform and sense the target object, wherein the processing circuit is further configured to determine the at least one distance between the first edge of the platform and the target object based on inputs from the one or more distance sensors.

13. The system of claim 11, wherein the processing circuit is further configured to:
allow just reverse movement of the drive vehicle in one of the allowable zones; and
allow just forward movement of the drive vehicle in the other one of the allowable zones.

14. The system of claim 11, wherein the processing circuit is further configured to move the drive vehicle at or less than a first upper limit speed when the first edge of the platform is beyond a predetermined distance from the target object and move the drive vehicle at or less than a slower second upper limit speed when the first edge of the platform is within the predetermined distance from the target object.

15. The system of claim 11, wherein the drive vehicle further comprises a body configured to attach to the platform and a plurality of drive members connected to the body and configured to move along a work floor.

16. A method of moving a platform relative to a target object, the method comprising:
receiving at least one command to move a drive vehicle connected to the platform;
determining at least one distances between the platform and the target object;
acquiring a relative angle between the drive vehicle and the platform;
determining a plurality of heading angle limits of the drive vehicle and a plurality of allowable zones based on the plurality of heading angle limits, the plurality of heading angle limits defined relative to a center line that extends through a point where the drive vehicle is connected to the platform and that is transverse to a pivot axis of the platform;
using the drive vehicle to move the platform in a first direction when commanded drive vehicle movement in the first direction is within one of the allowable zones; and
maintaining the platform at a current position when commanded drive vehicle movement in a second direction is outside of the allowable zones.

17. The method of claim 16, further comprising operating the drive vehicle in just a reverse state when the drive vehicle is facing into a first one of the allowable zones and operating the drive vehicle in just a forward state when the drive vehicle is facing into a second one of the allowable zones.

18. The method of claim 16, further comprising determining a plurality of prohibited zones that are positioned adjacent to and in a non-overlapping arrangement with the allowable zones and operating the drive vehicle in a rotate-only state when the drive vehicle is facing into one of the prohibited zones.

19. The method of claim 16, further comprising reducing a maximum speed of the drive vehicle when the platform moves within a predetermined distance from the target object.

20. The method of claim 16, further comprising displaying a different color for an indicator light on an operator interface each time that the drive vehicle transitions to a different operational state.

* * * * *